(12) United States Patent
Kawauchi et al.

(10) Patent No.: US 6,949,208 B1
(45) Date of Patent: Sep. 27, 2005

(54) INJECTION MOLDING PROCESS AND INJECTION MOLDING APPARATUS FOR THERMOPLASTIC RESIN MOLDED ARTICLES

(75) Inventors: Hitoshi Kawauchi, Kyoto (JP); Hiroshi Harada, Kyoto (JP); Hiroyuki Hirano, Kyoto (JP); Satoshi Shimura, Kyoto (JP)

(73) Assignee: Sekisui Chemical Co., Ltd., Osaka (JP)

( * ) Notice: Subject to any disclaimer, the term of this patent is extended or adjusted under 35 U.S.C. 154(b) by 281 days.

(21) Appl. No.: 10/221,440

(22) PCT Filed: Sep. 6, 2000

(86) PCT No.: PCT/JP00/06042

§ 371 (c)(1),
(2), (4) Date: Sep. 12, 2002

(87) PCT Pub. No.: WO01/68346

PCT Pub. Date: Sep. 20, 2001

(30) Foreign Application Priority Data

Mar. 14, 2000 (JP) ............................. 2000-70724

(51) Int. Cl.$^7$ ..................... B29C 44/02; B29C 44/38
(52) U.S. Cl. .................. 264/50; 264/51; 366/88; 425/4 R; 425/207; 425/208
(58) Field of Search ............... 264/50, 51, 53; 425/207, 208, 4 R; 366/88

(56) References Cited

U.S. PATENT DOCUMENTS

| | | | |
|---|---|---|---|
| 3,902,704 A | | 9/1975 | Ishibashi et al. |
| 3,986,709 A | * | 10/1976 | Vermeulen .................. 366/90 |
| 5,158,986 A | | 10/1992 | Cha et al. .................. 521/82 |
| 5,297,948 A | * | 3/1994 | Sadr .......................... 425/208 |

(Continued)

FOREIGN PATENT DOCUMENTS

DE 2034310 1/1972

(Continued)

OTHER PUBLICATIONS

International Search Report for PCT/JP00/06042 mailed on Dec. 20, 2000.

(Continued)

*Primary Examiner*—Allan R. Kuhns
(74) *Attorney, Agent, or Firm*—Rader, Fishman & Grauer PLLC

(57) ABSTRACT

An object of the invention is to provide an injection molding process for preparing thermoplastic resin molded articles and an injection molding apparatus for use in practicing this process, the process and the apparatus being adapted to supply a blowing agent, especially a nonreactive gas such as carbon dioxide or nitrogen gas, to a thermoplastic resin continuously at a relatively low pressure with good stability to incorporate the agent or gas into the resin. As shown in FIG. 3, a resin in a cylinder (2) of an injection molding machine (1) as melted by rotating a screw (3) is mixed and dissolves carbon dioxide which is supplied to the molten resin from a gas supply opening (5) formed in the screw (3). An amount of the gas-incorporating molten resin is measured out and injected into a mold cavity to obtain an expansion-molded article. To incorporate carbon dioxide into the molten resin, the gas is supplied from a gas inlet (11) formed in a rear end portion of the screw to a portion (4a) not fed with the resin and positioned between front and rear screw flights and closer to the front flight, through a gas supply channel 6 extending through the screw and via the supply opening (5).

8 Claims, 3 Drawing Sheets

U.S. PATENT DOCUMENTS 6,652,254 B2 * 11/2003 Shimura et al. ............ 425/4 R

FOREIGN PATENT DOCUMENTS

| DE | 27 07 623 A1 | 8/1978 |
| EP | 0 764 510 A2 | 3/1997 |
| JP | S47-008475 | 3/1972 |
| JP | H04-316823 | 11/1992 |
| JP | H10-180788 | 7/1998 |
| JP | 2000-084968 | 3/2000 |

OTHER PUBLICATIONS

Notification of Transmittal of Copies of Translation of the International Preliminary Examination Report mailed on Aug. 6, 2002.

Supplementary European Search Report to co-pending application mailed on Mar. 31, 2004.

* cited by examiner

INJECTION MOLDING PROCESS AND INJECTION MOLDING APPARATUS FOR THERMOPLASTIC RESIN MOLDED ARTICLES

TECHNICAL FIELD

The present invention relates to a process for producing thermoplastic resin molded articles, especially thermoplastic resin expansion-molded articles or molded articles of a thermoplastic resin which has a high melt viscosity and is not amenable to melt molding, and an injection molding apparatus useful for this process.

BACKGROUND ART

Processes for preparing thermoplastic resin expanded bodies by injection molding includes a process wherein carbon dioxide, nitrogen gas or like nonreactive gas serving as a blowing agent is incorporated into the molten resin and then the resin is injected into a mold for expansion.

Such expanding nonreactive gas is incorporated into the molten resin by 1) a method wherein the nonreactive gas is incorporated into the material resin in a solid state under a high pressure before placing the resin into a cylinder, or by 2) a method wherein the nonreactive gas is incorporated into the resin as melted within a cylinder as disclosed in the specification of U.S. Pat. No. 5,158,986.

However, although capable of affording a thermoplastic resin expanded body, the former method of incorporating the nonreactive gas into the solid material resin requires several tens of hours to saturate the resin with the gas for incorporation, for example, because there is a need to incorporate the gas into the resin within a pressure-resistant chamber, with the supply of resin to the molding machine interrupted, in order to completely incorporate the gas into the resin since the gas and the resin are low in affinity for each other. The method is therefore difficult to practice on an industrial scale.

On the other hand, with the latter method wherein the nonreactive gas is incorporated into the molten resin in the cylinder, the resin as in the form of pellets and supplied to the cylinder from a feed inlet is melted by the rotation of a screw within the cylinder, and carbon dioxide gas is supplied from a gas inlet in a portion of the cylinder while an amount of molten resin is being measured out by a measuring portion at the forward end of the cylinder, with the screw retracted. Since the resin within the cylinder is subjected to a high pressure during measurement, it is difficult to inject the gas into the molten resin unless the gas to be supplied is given a higher temperature than the molten resin. In the case where a gas of high pressure is used, the apparatus itself must have a pressure-resistant structure. This entails an increased production cost.

In view of the foregoing problems of the prior art, an object of the present invention is to provide an injection molding process for preparing thermoplastic resin molded articles and an injection molding apparatus for use in practicing this process, the process and the apparatus being adapted to supply a blowing agent, especially a nonreactive gas such as carbon dioxide or nitrogen gas, to a thermoplastic resin continuously at a relatively low pressure with good stability for the incorporation of the agent or gas into the resin.

DISCLOSURE OF THE INVENTION

To fulfill the above object, the present invention provides a first injection molding process for a thermoplastic resin molded article including the blowing agent incorporating step (i.e. dissolving step) of supplying through a blowing agent supply opening a blowing agent to a resin melted by rotating a screw within a cylinder of an injection molding machine and mixing the blowing agent with the molten resin for incorporation, and the injection molding step of measuring out an amount of the blowing agent-incorporating molten resin obtained and thereafter injecting the measured-out resin into a mold cavity to prepare an expansion-molded article, the injection molding process being characterized in that the blowing agent is incorporated into the molten resin by supplying the blowing agent from a blowing agent inlet formed in a rear end portion of the screw to a blowing agent supply channel provided in the screw and then from the supply opening to the interior of the cylinder (preferably at a position close to the front end thereof).

The present invention provides a second injection molding process for a thermoplastic resin molded article including the blowing agent incorporating step (i.e. dissolving step) of supplying through a blowing agent supply opening a blowing agent to a resin melted by rotating a screw within a cylinder of an injection molding machine and mixing the blowing agent with the molten resin for incorporation, and the injection molding step of measuring out an amount of the blowing agent-incorporating molten resin obtained and thereafter injecting the measured-out resin into a mold cavity to prepare an expansion-molded article, the injection molding process being characterized in that the blowing agent is incorporated into the molten resin by supplying the blowing agent from a blowing agent inlet formed in a rear end portion of the screw to a blowing agent supply channel provided in the screw and then from the supply opening to a portion not fed with the resin (i.e. a portion of the screw surface which is not covered with the resin and remains exposed) and positioned (for example, in the vicinity of the front end of the screw) between front and rear screw flights and closer to the front flight.

For use in the first or second injection molding process of the invention for preparing thermoplastic resin molded articles, the preferred blowing agent is a gas which is nonreactive with the resin.

The present invention provides a first injection molding apparatus for use in practicing an injection molding process for a thermoplastic resin molded article which process includes the blowing agent incorporating step of supplying through a blowing agent supply opening a blowing agent to a resin melted by rotating a screw within a cylinder of an injection molding machine and mixing the blowing agent with the molten resin for incorporation, and the injection molding step of measuring out an amount of the blowing agent-incorporating molten resin obtained and thereafter injecting the measured-out resin into a mold cavity to prepare an expansion-molded article, the injection molding apparatus being characterized in that the screw has a blowing agent inlet formed in a rear end portion thereof and a blowing agent supply channel extending through the screw longitudinally thereof and communicating with the inlet, the blowing agent supply opening being formed in a surface of the screw and opened to the interior of the cylinder, the supply opening being in communication with the inlet through the supply channel.

In the first injection molding apparatus of the invention, the blowing agent supply opening or the blowing agent supply channel inside the screw is preferably provided with a check valve for preventing the molten resin from ingressing into the supply channel from the supply opening.

The present invention provides a second injection molding apparatus for use in practicing an injection molding process for a thermoplastic resin molded article which process includes the blowing agent incorporating step of supplying through a blowing agent supply opening a blowing agent to a resin melted by rotating a screw within a cylinder of an injection molding machine and mixing the blowing agent with the molten resin for incorporation, and the injection molding step of measuring out an amount of the blowing agent-incorporating molten resin obtained and thereafter injecting the measured-out resin into a mold cavity to prepare an expansion-molded article, the injection molding apparatus being characterized in that the screw has a blowing agent inlet formed in a rear end portion thereof and a blowing agent supply channel extending through the screw longitudinally thereof and communicating with the inlet, the blowing agent supply opening being in communication with the inlet through the supply channel (and being disposed, for example, in the vicinity of the front end of the screw), the screw having (for example, in the vicinity of the front end thereof) front and rear flights of an increased pitch and/or a reduced shaft diameter and being thereby provided with an enlarged incorporating zone forming portion to form an enlarged incorporating zone which is greater than a space between flights which are positioned rearwardly of the flights, the blowing agent supply opening being opened to the incorporating zone, in a space between the front and rear flights, the blowing agent supply opening or the blowing agent supply channel inside the screw being provided with a check valve for preventing the molten resin from ingressing into the supply channel from the supply opening.

In the second injection molding apparatus of the invention, the blowing agent supply opening is opened preferably to a portion of the incorporating zone which portion is closer to the front flight and is not fed with the resin.

For use in the first or second injection molding apparatus of the invention, the preferred blowing agent is a gas which is nonreactive with the resin.

In the preferred mode of practicing the second molding process of the invention, a blowing agent supply opening is provided in the vicinity of the front end (the downstream end) of the screw (at a position slightly rearward, namely toward a hopper, from the front end), a portion not fed with the molten resin and positioned between front and rear screw flights and closer to the front flight is provided in the vicinity of the screw front end, and the blowing agent is incorporated (dissolved) into the resin in the incorporating step while the blowing agent is being supplied from the supply opening to this portion. The subsequent injection molding step affords an injection-molded article.

The first molding apparatus of the invention is used for practicing the first molding process. The second molding apparatus is used for practicing the second molding process.

With the injection molding processes and apparatus of the invention, the blowing agent supply opening is not limited to one in number but a plurality of supply openings may be provided. The supply opening need not always be positioned in the vicinity of the front end (the downstream end) of the screw but may be provided in other portion, for example, a lengthwise intermediate portion, of the screw.

According to the preferred embodiment of second molding apparatus of the invention, the screw has, in the vicinity of the front end (downstream end) thereof (at a position slightly rearward, namely toward a hopper, from the front end), front and rear flights of an increased pitch and/or a reduced shaft diameter and is thereby provided with an enlarged incorporating zone forming portion to form in a space between the front and rear flights an enlarged incorporating zone which is greater than a space between flights which are positioned rearwardly of the flights. This ensures smooth transport (i.e. a higher transportation speed) of the molten resin in the portion where the blowing agent supply opening is opened. The supply opening is opened to the incorporating zone.

A check valve is provided in the blowing agent supply opening or inside the screw in the vicinity of the opening for preventing the molten resin from ingressing into the supply channel in the screw from the supply opening. The check valve is positioned inside the screw in the vicinity of the supply opening, and is equipped, for example, with a spring. The valve is held closed by the force of the spring while no blowing agent is supplied, and is opened upon the pressure of the blowing agent admitted through the supply channel exceeding the biasing force of the spring, permitting supply of the blowing agent from the supply opening to the interior of the cylinder. If the molten resin acts to flow reversely from the blowing agent supply opening, the valve is closed by the force of the spring, preventing the ingress (reverse flow) of the resin into the supply channel.

The thermoplastic resin to be used in the present invention is not limited specifically. Examples of such resins are resins which are not amenable to melt molding because of a high melt viscosity, resins susceptible to thermal decomposition, resins which contain an additive of low boiling point or an additive susceptible to thermal decomposition and which are difficult to mold, etc.

Examples of resins which are not amenable to melt molding because of a high melt viscosity are superhigh molecular weight polyethylene, polyvinyl chloride of superhigh degree of polymerization, polytetrafluoroethylene, polyimide and like resins for use as engineering plastics.

Examples of resins susceptible to thermal decomposition are polylactic acid, polyhydroxybutyrate and like biodegradable resins, highly chlorinated polyvinyl chloride, polyacrylonitrile, etc.

The blowing agent for use in the present invention is not limited specifically insofar as the agent is nonreactive with the resin, will not deteriorate the resin or produces no adverse effect on the resin. Examples of useful agents are inorganic gases such as carbon dioxide, nitrogen, argon, neon helium and oxygen, and organic gases such as chlorofluorocarbons and low molecular weight hydrocarbons.

Preferable among these are inorganic gases because they are less likely to exert an adverse influence on the environment and need not be collected after use. Carbon dioxide is more preferable because the gas is highly soluble in resins which are difficult to mold, is effective for melting resins and produces little or no harm when released directly into the atmosphere. Such blowing agents may be used singly, or at least two gases are usable in combination.

BEST MODE OF CARRYING OUT THE INVENTION

A mode of carrying out the invention will be described below in detail with reference to the drawings.

The drawings show an embodiment of injection molding apparatus of the invention.

Figure 1:
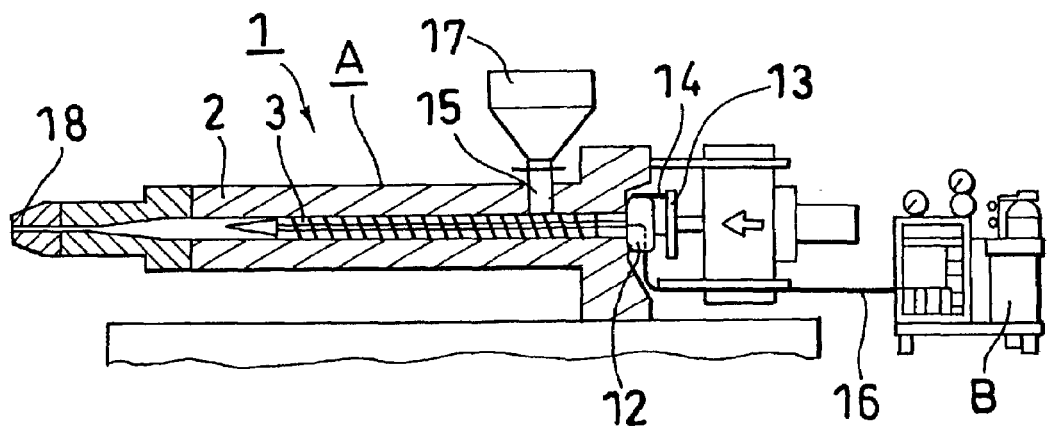
FIG. 1 is a side elevation partly broken away and showing an embodiment of injection molding apparatus.

As shown in FIG. 1, the injection molding apparatus A comprises an injection molding machine 1 and a gas injector B for feeding a gas to the machine. The injection molding machine 1 consists mainly of a cylinder 2 and a screw 3 disposed inside the cylinder.

Figure 2:
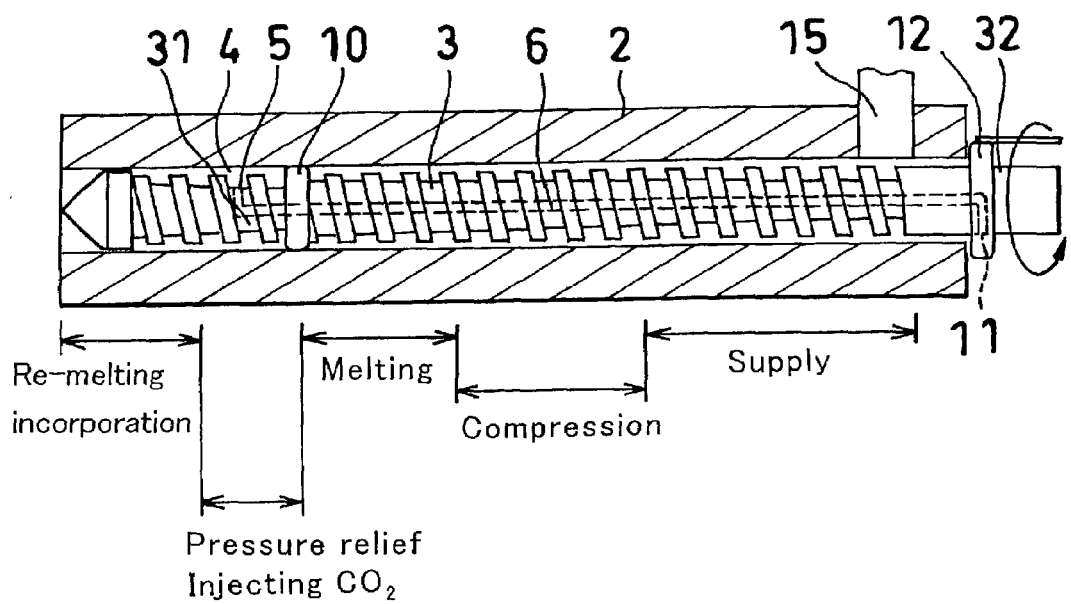
FIG. 2 is a side elevation partly broken away and generally showing the overall construction of an injection molding machine of the apparatus.
Figure 3:
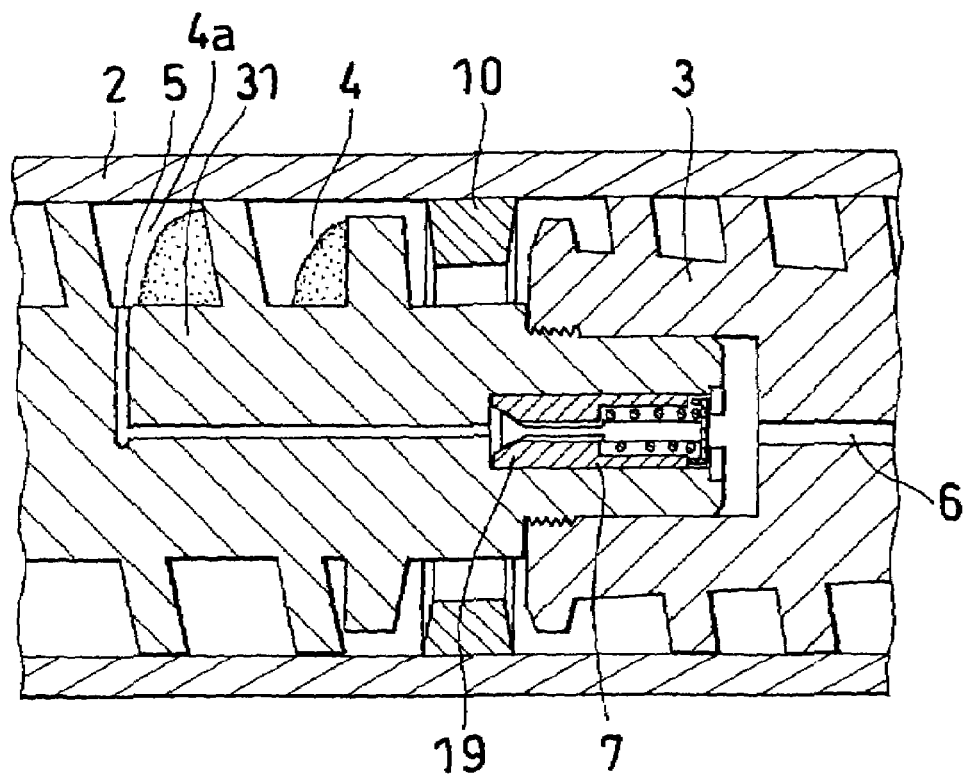
FIG. 3 is an enlarged view in longitudinal section and showing an enlarged incorporating zone forming portion of a screw and a check valve.

As shown in FIGS. 2 and 3, the screw 3 has an enlarged incorporating zone forming portion 31 of the following construction in the vicinity of the front end (the downstream end) of the screw (at a position slightly rearward, namely toward a hopper, from the front end). This portion 31 has a deeper screw groove than the other portion of the screw 3. As a result, the portion 31 has a greater distance between the inner surface of the cylinder 2 and the outer surface of the screw shaft, and the front and rear screw flights of this portion have an increased pitch. The enlarged incorporating zone forming portion 31 provided forms in the space between the front and rear flights an enlarged incorporating zone 4 which is greater than the space between the flights which are positioned rearwardly of the front and rear flights. Furthermore, a molten resin is fed at a higher speed in the enlarged incorporating zone 4 than in the upstream portion.

The screw has a gas supply opening 5 which is opened to a portion 4a of the zone 4 which portion is not fed with the resin and positioned closer to the front flight in the incorporating zone 4.

The screw is internally provided, in the incorporating zone forming portion 31 or in the vicinity thereof, with a check valve 7 for preventing the molten resin from ingressing into a gas supply channel 6 from the gas supply opening 5.

Figure 5:
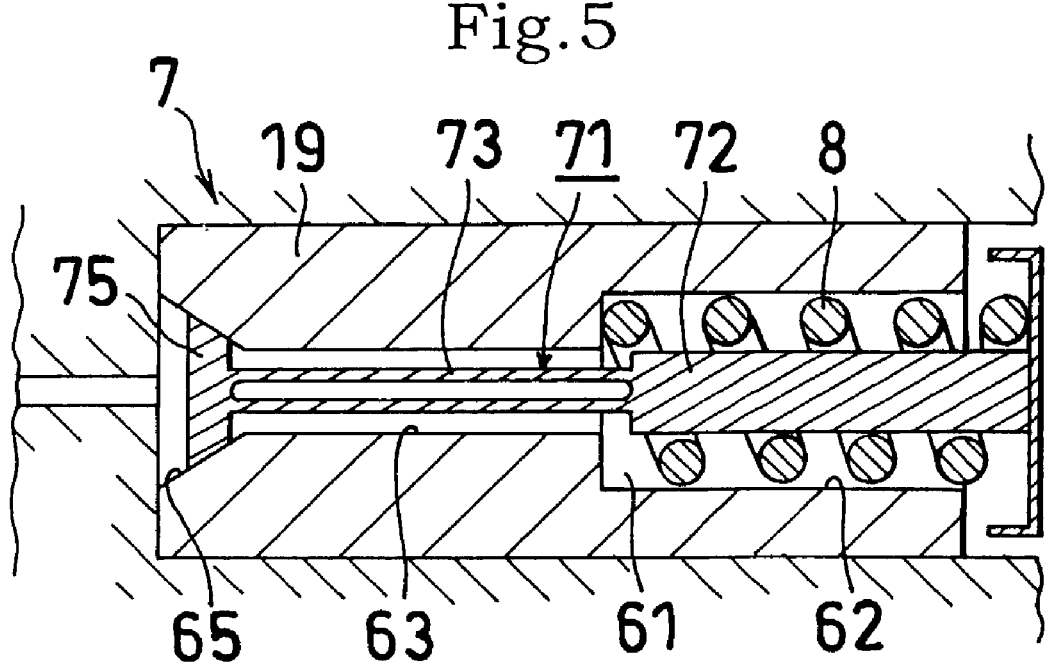
FIG. 5 is a view in longitudinal section and showing the check valve as closed.
Figure 6:
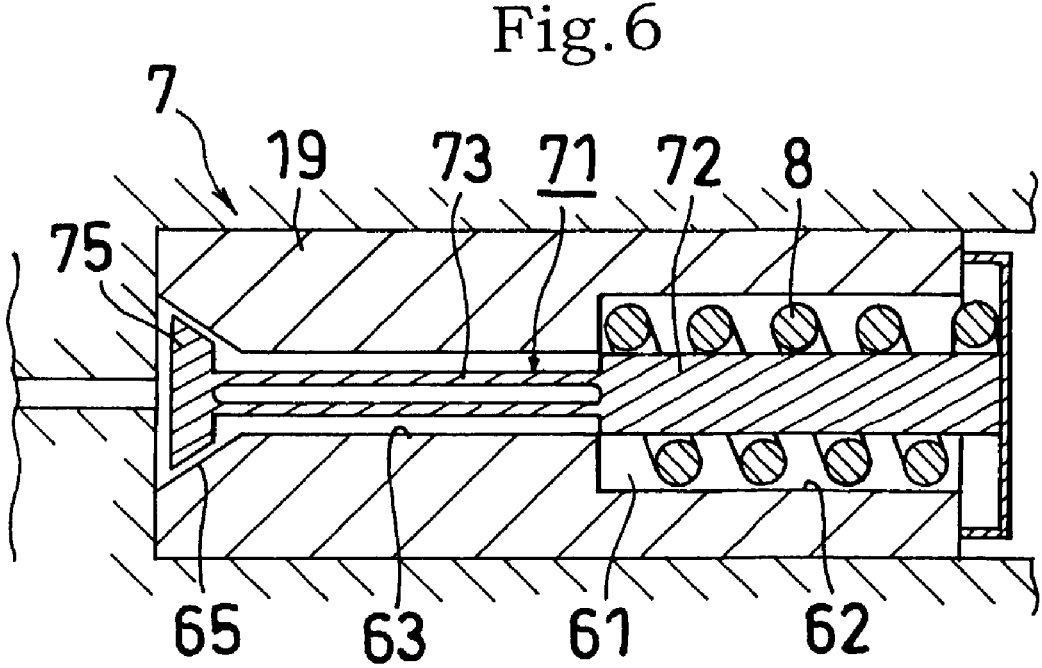
FIG. 6 is a view in longitudinal section and showing the check valve as opened.

With reference to FIGS. 5 and 6, the check valve 7 is of the spring-equipped type and comprises a casing 19, a valve body 71 of the shutoff type housed in the casing, and a spring 8 for biasing the valve body 71 toward a valve closing direction. Although the check valve is not limited to the above-mentioned type insofar as it opens upon the gas pressure exceeding the molten resin pressure, desirable is a valve of the spring type or ball-check type which is operable reliably. Alternatively, the check valve maybe a solenoid valve which detects the pressure of molten resin pressure and opens when the molten resin pressure becomes lower than a predetermined gas pressure.

The material of the check valve is not limited specifically insofar as it is resistant to heat at a temperature of at least 200° C., whereas a metal, especially stainless steel, is especially preferred from the viewpoint of strength, heat resistance, sliding properties and workability.

As shown in FIG. 5, the casing 19 has inside thereof a gas passageway 61 for holding the gas supply opening 5 in communication with the gas supply channel 6. The valve body 71 is movable forward and rearward as accommodated in the gas passageway 61. The gas passageway 61 has a large-diameter portion 62 for housing the spring 8 therein, a small-diameter portion 63 for housing a valve stem 73, and a valve seat portion 65 for receiving a conical face of a valve disk 75, these portions being as arranged from the channel (6) side toward the opening 5 in this order.

The valve body 71 is usually biased in the valve closing direction (rightward in FIG. 5) by the spring 8 with the valve disk 75 in intimate contact with the valve seat portion 65 of the casing 19 to close the valve, whereas when a gas is supplied to the gas supply opening 6 and the gas passageway 61, the gas pressure pushes the valve body 75 toward a valve opening direction against the biasing force of the spring 8. As shown in FIG. 6, the gas flows through the check valve 7 and is supplied to the molten resin in the cylinder around the screw via the gas supply opening 5.

Figure 4:
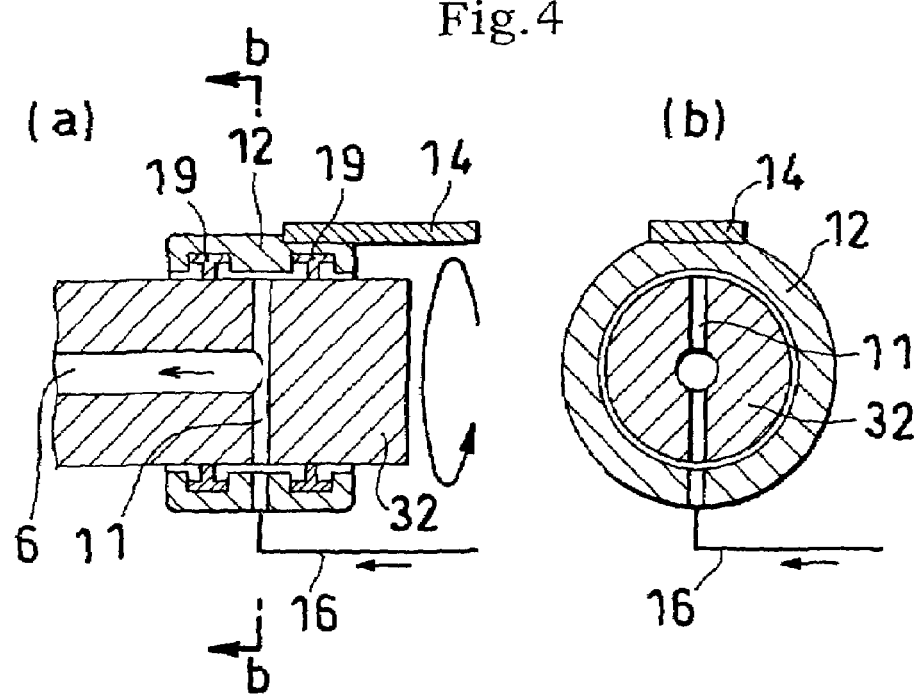
FIG. 4 shows an arrangement for connecting a gas conduit to a gas inlet by a seal box, FIG. 4(a) being a view in longitudinal section of a rear end portion of the screw, FIG. 4(b) being a view in section taken along the line b—b in FIG. 4(a).

As shown in FIGS. 2 and 4, on the other hand, a gas inlet 11 is formed in a rear end portion 32 of the screw for admitting into the gas supply channel 6 the gas supplied from the gas injector B through a gas conduit 16. The gas inlet 11 is in communication with the gas supply opening 5 through the channel 6. The conduit 16 is connected to a seal box 12 covering the gas inlet 11. The seal box 12 has a closed inside space in communication with the gas in let 11. Provided between the inner surface of the seal box 12 and the outer surface of the rear end portion 32 of the screw 3 in intimate contact therewith are seals 19 which are positioned respectively on the front side and the rear side of the gas inlet 11. The pair of seals 19 prevents the gas from leaking from the connection between the gas conduit 16 and the gas inlet 11 to the outside of the seal box. The gas from the conduit 16 is led from the closed space in the seal box 12 to the inlet 11 and then from the channel 6 to the supply opening 5 as described above.

The seal box 12 is fixed to the unit 13 of the injection molding machine 1 by a connecting arm 14 so as not to sift relative to the gas inlet 11 owing to the forward or rearward movement and rotation of the screw 3.

A check ring 10 is attached to the screw 3 at a position slightly rearward from the incorporating zone forming portion 31 as shown in FIG. 3 in order to prevent the gas-incorporating molten resin within the cylinder from flowing reversely toward the resin supply hopper owing to the gas pressure while the screw 3 is held out of rotation. The check ring 10 is especially suitable for use to prevent the reverse flow of the resin when the gas from the supply inlet 5 has a high pressure.

The injection molding apparatus A has the foregoing construction, so that when the material resin is supplied from the hopper 17 to the cylinder 2 through a feed inlet 15, the resin is sent toward the front end of the cylinder 2 while being melted and kneaded by the rotation of the screw 3. The molten resin kneaded is sent to a pressure relief zone, i.e., to the enlarged incorporating zone 4 through the check ring 10. On the other hand, the gas from the gas injector B enters the seal box 12 via the conduit 16, flows through the inlet 11, supply channel 6 and check valve 7 to the supply opening 5, from which the gas is supplied to the portion 4a not fed with the resin which portion is included in the incorporating zone 4 and positioned closer to the front flight thereof, whereby the gas is incorporated into the molten resin in the zone 4.

As the molten resin is continuously sent to the front end of the cylinder 2, the screw 3 gradually retracts with an increase in the amount of resin forwarded as shown in FIG. 1, and a predetermined amount of molten resin is measured out by a measuring portion at the front end of the cylinder 2.

The portion of gas-incorporating molten resin thus measured out is injected into an injection mold (not shown) to obtain an expansion-molded article.

The molding process to be practiced by the injection molding apparatus A of the construction described above makes it possible to uniformly incorporate a gas into a molten resin within a short period of time, consequently affording molded articles of homogeneously and finely expanded structure with high productivity.

An example is given below wherein a thermoplastic resin molded article was prepared using the injection molding apparatus A having the foregoing construction and shown in FIGS. 1 to 6.

Pellets of polypropylene resin (product of JPO Co. Ltd., Montel PF814) for use as a molding material were placed into the hopper 17 and supplied to the cylinder 2 via the feed inlet 15. The cylinder 2 was heated to a temperature of 200° C. The resin was melted, that is, plasticized by rotating the screw 3, and an amount of resin was measured out with the screw 3 retracted. During melting, carbon dioxide was supplied to the non-fed portion 4a of the incorporating zone 4 at a pressure of 6 MPa from the gas injector B by way of the conduit 16, seal box 12, gas inlet 11, gas supply channel 6, check valve 7 and gas supply opening 5 to incorporate (or dissolve) the gas into the molten resin fed in the zone 4.

The measured-out amount of resin was forced out of the front end 18 of the injection molding machine 1 to check the molding material for the gas-incorporating state. The molding material was found to be uniformly expanded, and the gas was found uniformly to be incorporated into the measured-out portion of resin.

The gas-incorporating molding material was then filled into a mold cavity in a mount of about ½ the volume of the cavity, the interior of the mold was cooled, and the mold was thereafter opened to take out an expansion-molded article from the mold.

The molding conditions are: temperature of the cylinder 2, 200° C.; resin filling rate, 200 mm/sec; molding temperature, 50° C.; and cooling time, 60 sec. The mold cavity was in the form of a cup measuring about 100 mm in diameter, 130 mm in height and 8 mm in wall thickness, and the molded article was so dimensioned in conformity with this shape. The molded article was smooth-surfaced and 2.2 times in average expansion ratio. The expansion-molded article had a uniform quality and was within 5% in the errors of various portions of the product.

The injection molding process of the invention for thermoplastic resin molded articles is adapted to continuously incorporate a gas into molten resin at a relatively low pressure with good stability without necessitating a long period of time for the incorporation of gas into resin unlike the prior art. Accordingly molded articles of finely expanded, homogeneous, highly functional (heat-insulating, shock absorbing, measured) structure can be provided by injection molding inexpensively.

The injection molding apparatus of the invention for thermoplastic resin molded articles is adapted to supply a gas to molten resin from a screw portion, therefore need not be made pressure-resistant in its entirety, can itself be reduced in cost and is capable of providing molded articles of homogeneous and finely expanded structure with high productivity like the usual injection molding method and also providing molded articles from materials which are difficult to mold.

INDUSTRIAL APPLICABILITY

The present invention relates to a process for producing thermoplastic resin molded articles, especially thermoplastic resin expansion-molded articles or molded articles of a thermoplastic resin which has a high melt viscosity and is not amenable to melt molding, and an injection molding apparatus useful for this process. According to the invention, a blowing agent, especially a nonreactive gas such as carbon dioxide or nitrogen gas, can be supplied to a thermoplastic resin continuously at a relatively low pressure with good stability for the incorporation of the agent or gas into the resin.

What is claimed is:

1. An injection molding process for a thermoplastic resin molded article including the blowing agent incorporating step of supplying through a blowing agent supply opening a blowing agent to a resin melted by rotating a screw within a cylinder of an injection molding machine and mixing the blowing agent with the molten resin for incorporation, and the injection molding step of measuring out an amount of the blowing agent-incorporating molten resin obtained and thereafter injecting the measured-out resin into a mold cavity to prepare an expansion-molded article, the injection molding process being characterized in that the blowing agent is incorporated into the molten resin by supplying the blowing agent from a blowing agent inlet formed in a rear end portion of the screw to a blowing agent supply channel provided in the screw and then from the supply opening into an enlarged incorporating zone forming portion defined as having a deeper screw groove relative to a remaining portion of the screw, the enlarged incorporating zone portion having a portion not fed with the resin where the supply opening is located and positioned between front and rear screw flights and closer to the front flight and the enlarged incorporating zone forming portion being further defined by front and rear screw flights having an increased pitch relative to remaining ones of screw flights of the screw.

2. An injection molding process for a thermoplastic resin molded article according to 1 which is characterized in that the blowing agent is a gas which is nonreactive with the resin.

3. An injection molding apparatus for use in practicing an injection molding process for a thermoplastic resin molded article including the blowing agent incorporating step of supplying through a blowing agent supply opening a blowing agent to a resin melted by rotating a screw within a cylinder of an injection molding machine and mixing the blowing agent with the molten resin for incorporation, and the injection molding step of measuring out an amount of the blowing agent-incorporating molten resin obtained and thereafter injecting the measured-out resin into a mold cavity to prepare an expansion-molded article, the injection molding apparatus for a thermoplastic resin molded article being characterized in that the screw has a blowing agent inlet formed in a rear end portion thereof and a blowing agent supply channel extending through the screw longitudinally thereof and communicating with the inlet, the blowing agent supply opening being formed in a surface of the screw and opened to an enlarged incorporating zone forming portion defined as having a deeper screw groove relative to a remaining portion of the screw, the supply opening being in communication with the inlet through the supply channel and the enlarged incorporating zone forming portion being further defined by front and rear screw flights having an increased pitch relative to remaining ones of screw flights of the screw.

4. An injection molding apparatus for a thermoplastic resin molded article according to claim 3 which is characterized in that the blowing agent supply opening or the blowing agent supply channel inside the screw is provided with a check valve for preventing the molten resin from ingressing into the supply channel from the supply opening.

5. An injection molding apparatus for a thermoplastic resin molded article according to any one of claims 3 and 4 which is characterized in that the blowing agent is a gas which is nonreactive with the resin.

6. An injection molding apparatus for use in practicing an injection molding process for a thermoplastic resin molded article including the blowing agent incorporating step of supplying through a blowing agent supply opening a blowing agent to a resin melted by rotating a screw within a cylinder of an injection molding machine and mixing the blowing agent with the molten resin for incorporation, and the injection molding step of measuring out an amount of the blowing agent-incorporating molten resin obtained and thereafter injecting the measured-out resin into a mold cavity to prepare an expansion-molded article, the injection molding apparatus for a thermoplastic resin molded article being characterized in that the screw has a blowing agent inlet formed in a rear end portion thereof and a blowing agent supply channel extending through the screw longitudinally thereof and communicating with the inlet, the blowing agent supply opening being in communication with the inlet through the supply channel, the screw having front and rear flights of an increased pitch and/or a reduced shaft diameter and thereby being provided with an enlarged incorporating zone forming portion to form an enlarged incorporating zone which is greater than a space between flights which are positioned rearwardly of the flights, the blowing agent supply opening being opened to the incorporating zone, the blowing agent supply opening or the blowing agent supply channel inside the screw being provided with a check valve for preventing the molten resin from ingressing into the supply channel from the supply opening.

7. An injection molding apparatus for a thermoplastic resin molded article according to claim 6 which is characterized in that the blowing agent supply opening is opened to a portion of the incorporating zone which portion is closer to the front flight and is not fed with the resin.

8. An injection molding apparatus for a thermoplastic resin molded article according to any one of claims 6 and 7 which is characterized in that the blowing agent is a gas which is nonreactive with the resin.

* * * * *